United States Patent
Kranz (10) Patent No.: US 11,703,148 B2
(45) Date of Patent: Jul. 18, 2023

(54) AERIAL CABLE MANAGEMENT DEVICE

(71) Applicant: AFL Telecommunications LLC, Duncan, SC (US)

(72) Inventor: Steven Kranz, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/160,035

(22) Filed: Jan. 27, 2021

(65) Prior Publication Data
US 2021/0324971 A1    Oct. 21, 2021

Related U.S. Application Data

(60) Provisional application No. 63/011,612, filed on Apr. 17, 2020.

(51) Int. Cl.
*F16L 3/015* (2006.01)
*H02G 11/00* (2006.01)

(52) U.S. Cl.
CPC .............. *F16L 3/015* (2013.01); *H02G 11/00* (2013.01)

(58) Field of Classification Search
CPC ... F16L 3/015; F16L 3/00; F16L 3/003; F16L 3/01; F16L 3/02; F16L 3/04; F16L 3/06; F16L 3/08; F16L 3/085; F16L 3/10; F16L 3/1008
USPC ...... 248/65, 67.7, 69, 70, 89, 73, 74.1, 74.2, 248/74.3, 75, 76, 80, 81, 83, 85, 87, 248/90–92
See application file for complete search history.

(56) References Cited

U.S. PATENT DOCUMENTS

| | | | | | |
|---|---|---|---|---|---|
| 325,394 | A | * | 9/1885 | Cavalli | B65H 49/30 242/129 |
| 493,719 | A | * | 3/1893 | Henderson | H04R 1/342 248/75 |
| 701,317 | A | * | 6/1902 | English | B65H 49/30 242/577.4 |
| 2,057,728 | A | * | 10/1936 | Lester | B65H 49/30 242/577.2 |
| 2,261,943 | A | * | 11/1941 | Rogers | F26B 9/003 242/404 |
| 2,463,192 | A | * | 3/1949 | Edward | B65H 75/22 242/407.1 |
| 2,912,482 | A | * | 11/1959 | Miller | H02G 7/12 174/146 |
| 3,058,688 | A | * | 10/1962 | Abel | B65H 49/30 242/407.1 |
| 5,042,767 | A | * | 8/1991 | Yunker | H02G 1/14 248/201 |
| 5,700,980 | A | * | 12/1997 | Bello | H02G 7/12 174/146 |
| 6,215,937 | B1 | * | 4/2001 | Dinh | G02B 6/483 385/134 |
| 6,676,061 | B1 | * | 1/2004 | Cain | B65H 75/364 242/401 |
| 7,080,802 | B2 | * | 7/2006 | Bayer | B65H 49/305 242/129 |

(Continued)

*Primary Examiner* — Nkeisha Smith
(74) *Attorney, Agent, or Firm* — Dority & Manning, P.A.

(57) ABSTRACT

An aerial cable management device includes a trunk; and a plurality of arms, each arm including a body defining a central pivot point and having a cable support element disposed at both opposite ends of the body, wherein each of the plurality of arms is rotatably coupled with the trunk in a shared direction of rotation.

16 Claims, 5 Drawing Sheets

(56) References Cited

U.S. PATENT DOCUMENTS

| | | | | |
|---|---|---|---|---|
| 7,376,326 | B2* | 5/2008 | Corbeels | G02B 6/483 |
| | | | | 385/135 |
| 7,448,570 | B2* | 11/2008 | Bohnisch | B65H 49/30 |
| | | | | 242/557 |
| 7,580,607 | B2* | 8/2009 | Jones | G02B 6/483 |
| | | | | 385/134 |
| 8,220,757 | B2* | 7/2012 | Gardner | F16L 3/2431 |
| | | | | 248/58 |
| 10,218,162 | B2* | 2/2019 | Talabathula | H02G 7/20 |
| 11,084,686 | B2* | 8/2021 | Chappell, II | B65H 75/364 |
| 2001/0008260 | A1* | 7/2001 | Messier | B65H 49/30 |
| | | | | 242/171 |
| 2002/0003939 | A1* | 1/2002 | Hermsen | G02B 6/483 |
| | | | | 385/135 |
| 2008/0173462 | A1* | 7/2008 | Whapham | H02G 7/125 |
| | | | | 174/42 |
| 2012/0318379 | A1* | 12/2012 | Benard | E21B 19/002 |
| | | | | 137/343 |
| 2014/0020183 | A1* | 1/2014 | Dominick | A61G 1/013 |
| | | | | 5/627 |

* cited by examiner

AERIAL CABLE MANAGEMENT DEVICE

CROSS-REFERENCE TO RELATED APPLICATIONS

The present application claims priority to U.S. Provisional Patent Application 63/011,612, filed on Apr. 17, 2020, the disclosure of which is incorporated by reference herein in its entirety.

FIELD

The present disclosure relates generally to aerial cable management devices to be used for management of cables.

BACKGROUND

During cable storage of field installed cable, a cable is pulled to make a loop and the excess is wrapped in a coil. If a large enough loop where the cable "doubles-back" is not maintained, the minimum bend radius can be exceeded in the cable and can lead to attenuation or breaking of the fiber optics within the cable. Cable management devices today are large and bulky and not desired for coiled storage.

Accordingly, improved cable management devices are desired in the art. In particular, cable management devices which provide improved collapsibility without compromising on strength would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, an aerial cable management device is provided. The aerial cable management device includes a trunk; and a plurality of arms, each arm including a body defining a central pivot point and having a cable support element disposed at both opposite ends of the body, wherein each of the plurality of arms is rotatably coupled with the trunk in a shared direction of rotation.

In accordance with another embodiment, an aerial cable management device is provided. The aerial cable management device includes a body having an in-use configuration and a collapsed configuration, wherein at least one effective dimension of the aerial cable management device is at least 60% less in the collapsed configuration as compared to the in-use configuration.

In accordance with another embodiment, a method of using an aerial cable management device is provided. The method includes reconfiguring the aerial cable management device between a collapsed configuration and an in-use configuration by rotating a plurality of arms of the aerial cable management device along a generally shared direction of rotation; and wrapping a cable around one or more cable support elements disposed on the plurality of arms.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. The term "retain" is used to refer to a less permanent engagement protocol than that of the term "coupled". By way of example, a "retained" cable may be removed from retainment through transverse (i.e., sideways) displacement, whereas a "coupled" cable may require removal of one or more coupling elements like clips, fasteners, or the like. As used herein, the terms "comprises," "comprising" "includes." "including," "has," "having" or any other variation thereof, are intended to cover a non-exclusive inclusion. For example, a process, method, article, or apparatus that comprises a list of features is not necessarily limited only to those features hut may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
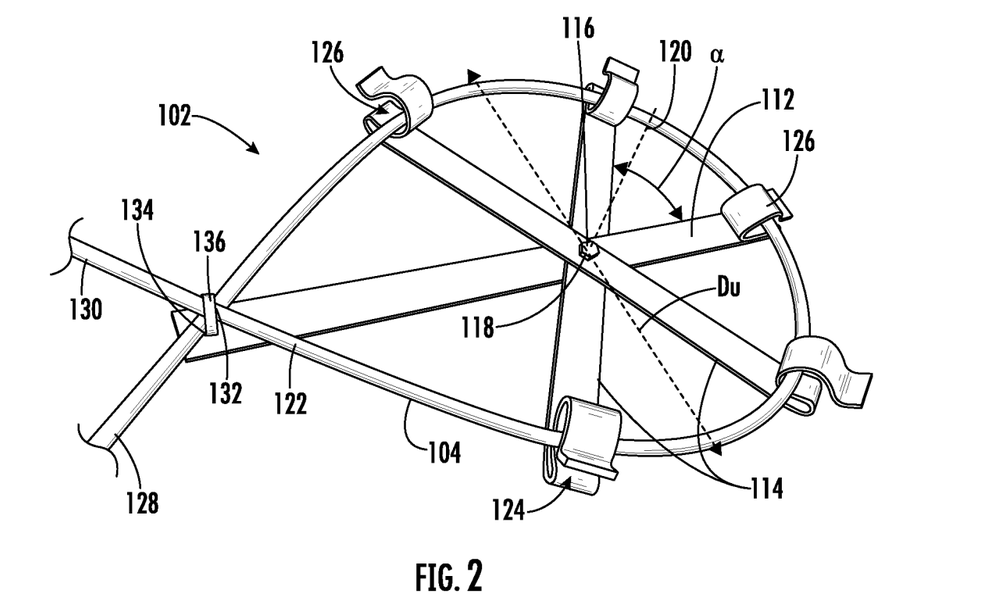
FIG. 2 is a perspective front view of the aerial cable management device in an in-use configuration in accordance with embodiments of the present disclosure.

In general, aerial cable management devices in accordance with embodiments described herein may be used along aerial cable systems to take up slack in cables, e.g., aerial optical fiber cables. Aerial cable management devices in accordance with one or more embodiments described herein may avoid issues associated with exceeding minimum bend radii of cables while permitting a readily transportable system that occupies minimal space. Aerial cable management devices in accordance with one or more embodiments described herein can generally include a plurality of arms which rotate in a shared, or generally shared, direction between a collapsed configuration (FIG. 5) and an in-use configuration (FIG. 2). In the collapsed configuration, the aerial cable management device may have an effective dimension that is at least 60% less than the same effective dimension in the in-use configuration. Accordingly, the aerial cable management device may be readily transportable and avoid bulkiness issues without compromising on strength. The aerial cable management device can further include braces which provide additional structural rigidity and maintain the plurality of arms in the in-use configuration.

Figure 1:
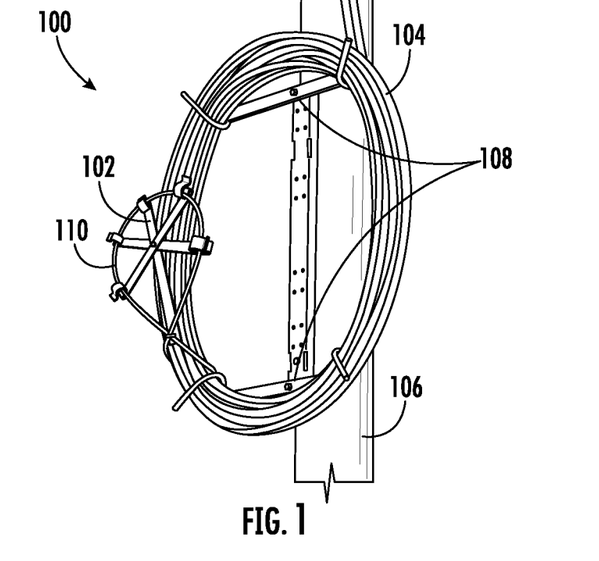
FIG. 1 is schematic view of an aerial cable system including an aerial cable management device in accordance with embodiments of the present disclosure.

Referring now to the drawings, FIG. 1 illustrates a schematic view of an exemplary aerial cable system 100 including an aerial cable management device 102. The aerial cable system 100 includes a cable 104 coupled between a plurality of aerial poles, including an aerial pole 106. In certain locations along the aerial cable system 100 it may be desirable to have excess slack cable 104. To store the excess slack cable, the cable 104 can be wrapped around a guide 108 attached to the aerial pole 106. The guide 108 depicted in FIG. 1 includes four posts around which the cable 104 is wrapped. Since the middle of the cable 104 is wrapped around the guide 108, a sharp bend is created at the end 110 of the wrap. At this location, the cable 104 is subjected to high bending forces. Bending the cable 104 too much at the end 110 of the wrap can damage the cable 104, e.g., causing attenuation or breaking of optical fibers contained therein. To prevent the cable 104 from exceeding a minimum bend radius at which damage can occur, the aerial cable management device 102 can be installed within the cable 104 at the end 110 of the wrap.

In an embodiment, the aerial cable management device 102 is configured to retain the cable 104 in a wrapped loop. The loop can be disposed in a best-fit plane extending in a generally vertical direction. The cable 104 can include an aerial cable, such as for example, a telecommunication wire. One exemplary telecommunication wire is a fiber optic wire. The cable 104 can span successive aerial poles with one or more branching cables connected therewith.

Figure 4:
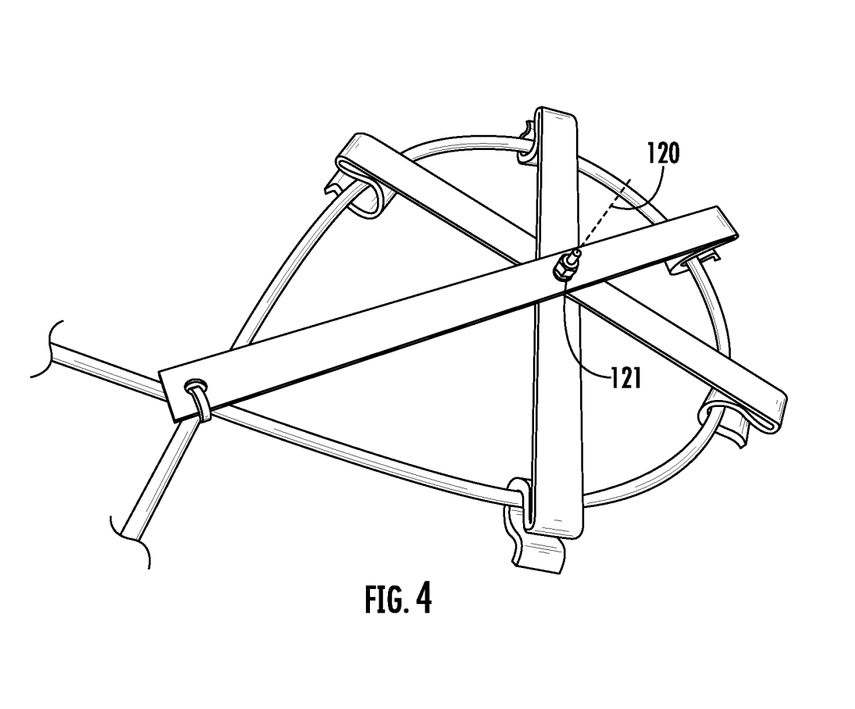
FIG. 4 is a perspective rear view of the aerial cable management device in the in-use configuration in accordance with embodiments of the present disclosure.

FIG. 2 illustrates a front perspective view of the aerial cable management device 102 in accordance with an embodiment. The aerial cable management device 102 can generally include a main component, hereinafter referred to as the trunk 112, and at least one arm 114, such as a plurality of arms 114, such as at least 2 arms 114, such as at least 3 arms 114, such as at least 4 arms 114, etc. In the illustrated embodiment, the aerial cable management device 102 includes two arms 114 coupled to the trunk 112 through a central pivot point 116. In other embodiments, the arm 114 can be coupled to the trunk 112 through a non-centrally located pivot point of at least one of the arms 114 or the trunk 112 (i.e., at least one of the elements of the aerial cable management device 102 can rotate about a non-centralized pivot point). The pivot point 116 can include a pivotal element 118, such as a bearing, shank, bolt, rivet, another type of fastener, or other similar structure which can form a rotational axis 120 about which the arm 114 can rotate. In the case of a threaded fastener, a nut 121 (FIG. 4) can be used along a rear side of the trunk 112 so as to secure the fastener relative to the pivot point 116. In an embodiment, the arms 114 can be rotatably coupled with the trunk 112 in a shared, or generally shared, direction of rotation. That is, the arms 114 can rotate around the same rotational axis 120, i.e., within the same plane or along parallel planes.

Figure 5:
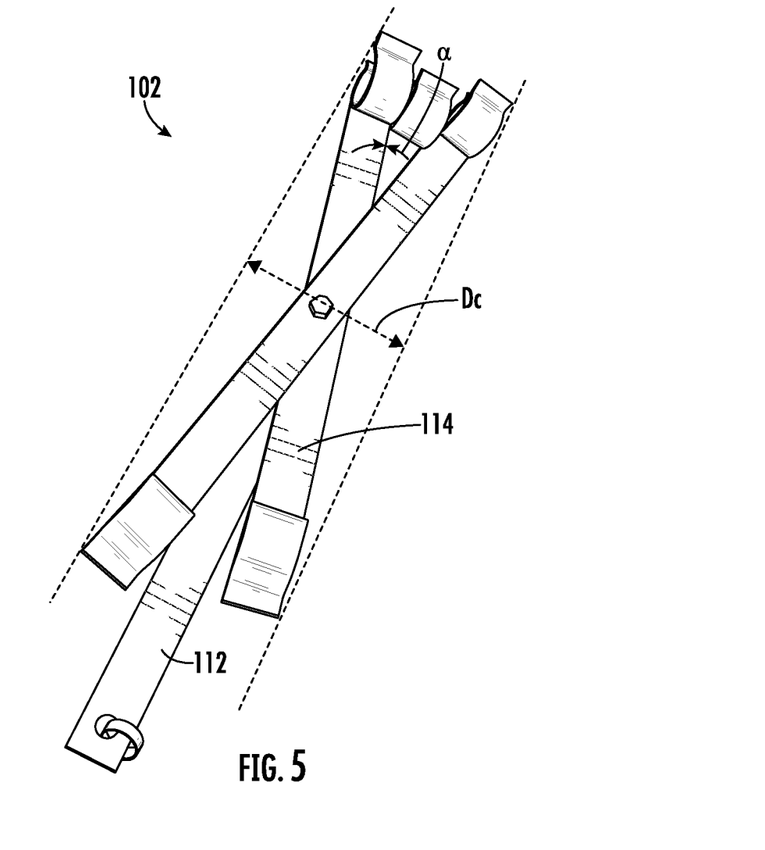
FIG. 5 is a perspective front view of the aerial cable management device as seen in a collapsed configuration in accordance with embodiments of the present disclosure.

In an embodiment, the aerial cable management device 102 can be reconfigured between an in-use configuration (like shown in FIG. 2) and a collapsed configuration (like shown in FIG. 5). Reconfiguring the aerial cable management device 102 can be performed, for example, by rotating at least one of the trunk 112 or at least one of the arms 114 about the rotational axis 120.

In an embodiment, an effective dimension of the aerial cable management device 102 can be at least 60% less in the collapsed configuration as compared to the in-use configuration, such as at least 70% less in the collapsed configuration as compared to the in-use configuration, such as at least 80% less in the collapsed configuration as compared to the in-use configuration, such as at least 90% less in the collapsed configuration as compared to the in-use configuration. For example, in the in-use configuration, the aerial cable management device 102 can define an effective dimension, $D_U$, that is greater than the effective dimension 1.15 $D_C$, such as at least 1.2 $D_C$, such as at least 1.3 $D_C$, such as at least 1.4 $D_C$, such as at least 1.5 $D_C$, such as at least 1.75 $D_C$, such as at least 2.0 $D_C$, such as at least 2.25 $D_C$, such as at least 2.5 $D_C$, such as at least 3.0 $D_C$. A relative ratio of $D_U$ to $D_C$ can be determined, for example, by available rotational displacement between the trunk 112 and arms 114, the location of pivot point 116, the length of the trunk 112 or arms 114, or the like. In an embodiment, an angular offset, α, formed by at least one of the arms 114 between the in-use configuration and the collapsed configuration can be at least 10°, such as at least 20°, such as at least 30°, such as at least 45°, such as at least 60°, such as at least 80°. In a particular embodiment, the angular offset, α, can be approximately, such as exactly, 90°.

In the in-use configuration, the arm(s) 114 can define a cable pathway 122 configured to support the cable 104 in a desired shape, e.g., so as to accommodate the end 110 of the wrap. The cable pathway 122 can define an arcuate shape, such as for example, a circular shape, an ovular shape, a tear drop shape, or the like. The cable pathway 122 can define a shape, as viewed in a direction normal to the arcuate shape, that is free, or essentially free, of kinks and sharp bends which might damage the cable 104. The cable pathway 122 can generally extend around a perimeter of the aerial cable management device 102, i.e., adjacent to a perimeter of the arm 114 in the in-use configuration. The cable pathway 122 can be formed, at least in part, by one or more cable support elements 124. The cable support elements 124 can include a plurality of cable support elements 124, such as at least two cable support elements 124, such as at least four cable support elements 124, such as at least five cable support elements 124, such as at least 6 cable support elements 124. In certain instances, all of the cable support elements 124 can share a same or similar shape or size as compared to one another. In other instances, at least two of the cable support elements 124 can have different characteristics or attributes as compared to one another. In an embodiment, the cable support elements 124 can be disposed at ends of the arm 114. In a more particular embodiment, at least one of the arms 114 can have one cable support element 124 disposed at each opposite end thereof.

Figure 3:
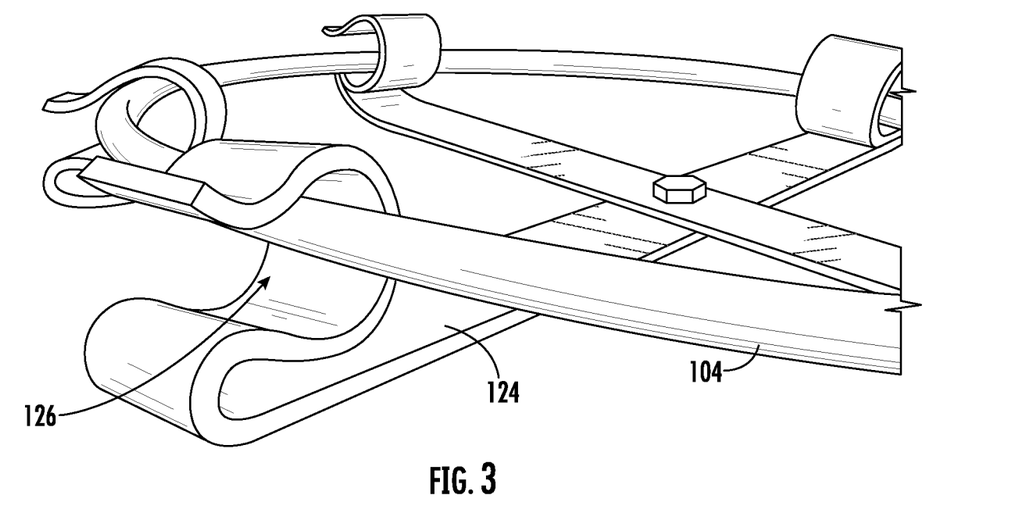
FIG. 3 is an enlarged view of a cable support element of the aerial cable management device in accordance with embodiments of the present disclosure.

In an embodiment, at least one of the cable support elements 124 can generally define a body that is a discrete element that can be attached to the arm 114, e.g., by adhesive, fastener(s), overmolding, and the like. In another embodiment, at least one of the cable support elements 124 can be integral with the arm 114. For example, the exemplary cable support elements 124 depicted in FIG. 3 are integral with the arms 114, i.e., of a unitary construction, formed by rolling a generally C-shaped receiving area 126 at both opposite ends of the arms 114. Together, the receiving areas 126 can define the cable pathway 122. As further depicted, the trunk 112 can include one or more cable support elements 124. The cable support element(s) 124 of the trunk 112 can act together with the cable support elements 124 of the arm(s) 114 to form the cable pathway 122. In an embodiment, at least one of the cable support elements 124 can define a narrow throat through which the cable 104 is passed prior to entering the at least one cable support element 124. In an embodiment, the throat can define a dimension less than a dimension of the cable 104 so as to prevent the cable 104 from accidently detaching therefrom. In a further embodiment, a fastener, such as a zip tie, may be utilized at, or adjacent to, the throat to secure the cable 104 within the cable support element 124.

The cable pathway 122 depicted in FIG. 2 extends along an innermost location of the receiving areas 126. The receiving areas 126 can define cable tension locations where the cable 104 is configured to apply force to the receiving areas 126. The receiving areas 126 can be configured to support the cable tension. By way of non-limiting example, support generated by the receiving areas 126 can be oriented in a direction generally parallel with the shared direction of rotation of the arm(s) 114, e.g., normal to the rotational axis 120. In an embodiment, retaining the cable 104 can include retaining cable tension at the arm(s) 114 and fixedly coupling the cable 104 to the trunk 112. In a more particular embodiment, the trunk 112 can further include a receiving area 126 configured to retain the cable 104 through cable tension.

The cable 104 can enter and exit the aerial cable management device 102 at location 128 and 130. In an embodiment, the cable 104 can intersect itself at a cable cross-over location 132. In a particular instance, the cross-over intersection of the cable 104 is viewable in a direction normal to the rotational axis 120. The cable cross-over location 132 can be disposed along the trunk 112. In an embodiment, the cable cross-over location can be disposed adjacent to the entrance or exit locations 128 or 130. In an embodiment, the cable 104 can be coupled to the aerial cable management device 102 at a cable coupling location 134. In the illustrated embodiment, the cable coupling location 134 includes a hole in the trunk 112 configured to couple the cable 104 to the trunk 112 using a fastener 136. By way of example, the fastener 136 can include a zip tie, string, wire, clamp, one or more clips, snaps, or the like. The cable coupling location 134 can be disposed adjacent to the cable cross-over location 132.

Figure 6:
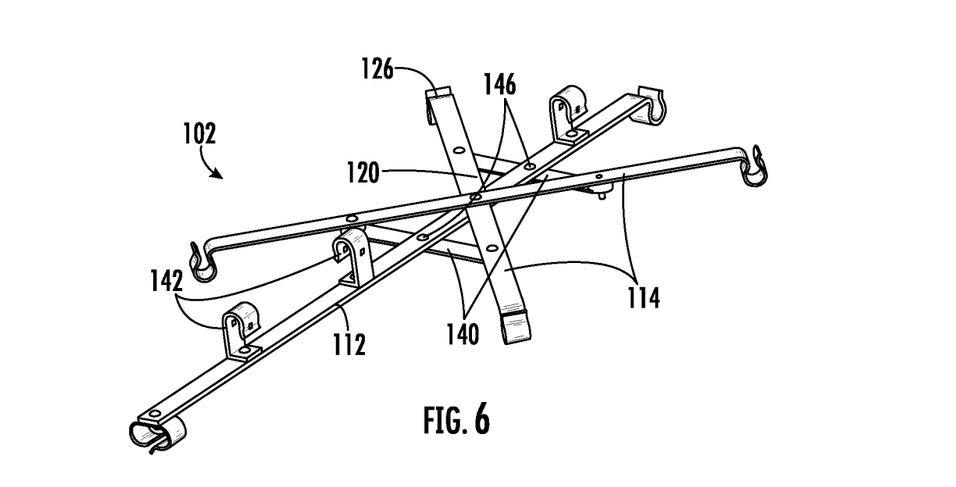
FIG. 6 is a perspective front view of an aerial cable management device as seen in the in-use configuration in accordance with embodiments of the present disclosure.

FIG. 6 illustrates the aerial cable management device 102 in accordance with another exemplary embodiment of the present disclosure. In the embodiment illustrated in FIG. 6, the trunk 112 is fixedly attached to the arms 114 using braces 140 when the aerial cable management device 102 is in the in-use configuration. The braces 140 can include members extending between the arms 114. The braces 140 may be coupled with the arms 114, e.g., using fasteners. The braces 140 may be further coupled with the trunk 112. In such a manner, the aerial cable management device 102 can be supported in the in-use configuration such that external forces do not cause the aerial cable management device 102 to move, i.e., rotate, to the collapsed configuration. The braces 140 may be removable, e.g., detachable, from at least one of the trunk 112 or arms 114 to permit collapse of the aerial cable management device 102. In certain instances, the braces 140 can remain attached to the aerial cable management device 102 after the brace 140 is removed to permit collapse. For instance, at least one of the braces 140 can remain coupled with the trunk 112. In an embodiment, the at least one brace 140 can be reconfigured to occupy less space when in the collapsed configuration.

In the embodiment illustrated in FIG. 6, the receiving areas 126 are open in an axial direction, i.e., generally parallel with the rotational axis 120, unlike the receiving areas 126 depicted in FIG. 3, which are open in the radial direction, i.e., transverse to the rotational axis 120. In the embodiment illustrated in FIG. 6, the cable 104 is inserted into the receiving areas 126 by translating the cable 104 and aerial cable management device 102 together in a direction parallel with the rotational axis 120. In the embodiment illustrated in FIG. 3, the cable 104 is inserted into the receiving areas 126 by inserting the aerial cable management device 102 into the loop of the cable 104 and then changing, e.g., reducing, the circumference of the loop. While all receiving areas 126 of each aerial cable management device 102 are depicted as having open sides in the same direction, in another embodiment, the receiving areas 126 can be open in opposite axial directions. For instance, each arm 114 can include a first receiving area 126 extending axially in a first direction (axial being parallel with the rotational axis 120) and a second receiving area extending axially in the second (opposite) direction.

Figure 10:
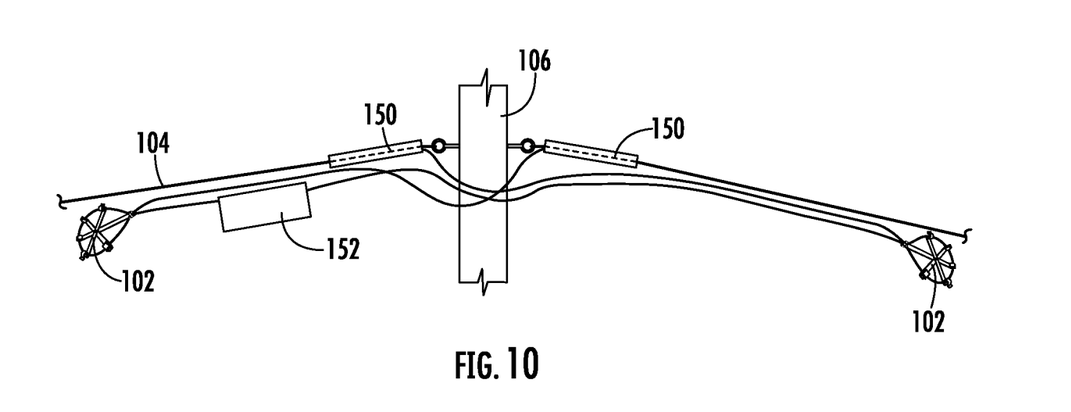
FIG. 10 is a view of the aerial cable management device hanging from a cable that extends from an aerial pole.

The aerial cable management device 102 illustrated in FIG. 6 further includes clips 142 disposed along the trunk 112. The clips 142 can be used for suspending the cable management device 102 from a wire or cable 104 strung between aerial poles 106. For example, referring to FIG. 10, the aerial cable management device 102 can hang from the cable 104 or another wire extending between aerial poles 106. The clips 142 can connect the aerial cable management device 102 to the cable 104 or other wire. In this configuration, the aerial cable management device 102 can hang in the horizontal or vertical planes. In a particular embodiment, the aerial cable management device 102 hangs in the horizontal plane. The slacked portion of the cable 104 can be attached to the tensioned portion of the cable 104, e.g., using zip ties or other fasteners. The cable 104 or other wire can be connected to the aerial pole 106 through a dead end. A splice enclosure 152 can be disposed on the cable 104.

Figure 7:
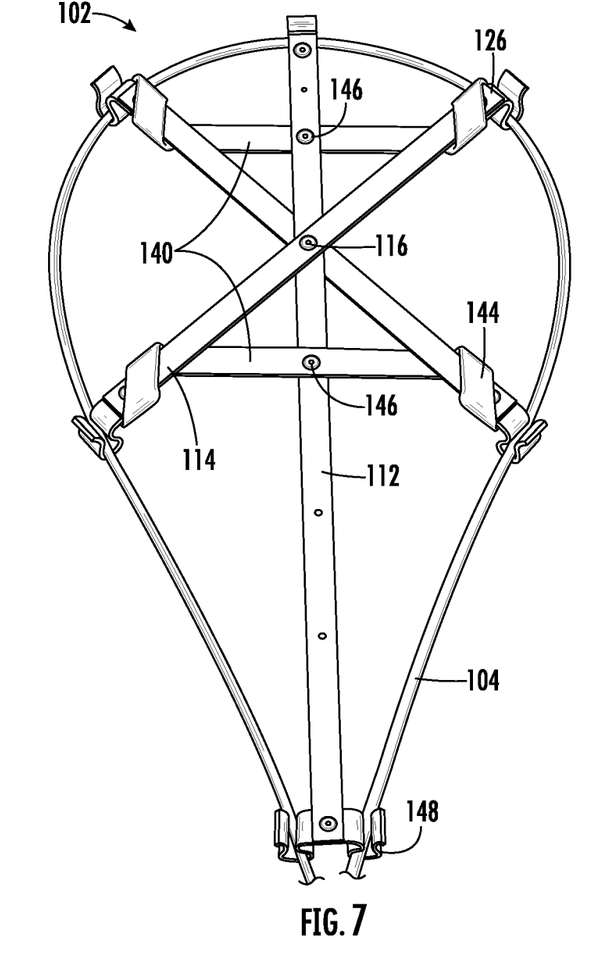
FIG. 7 is a perspective front view of an aerial cable management device as seen in the in-use configuration in accordance with embodiments of the present disclosure.
Figure 8:
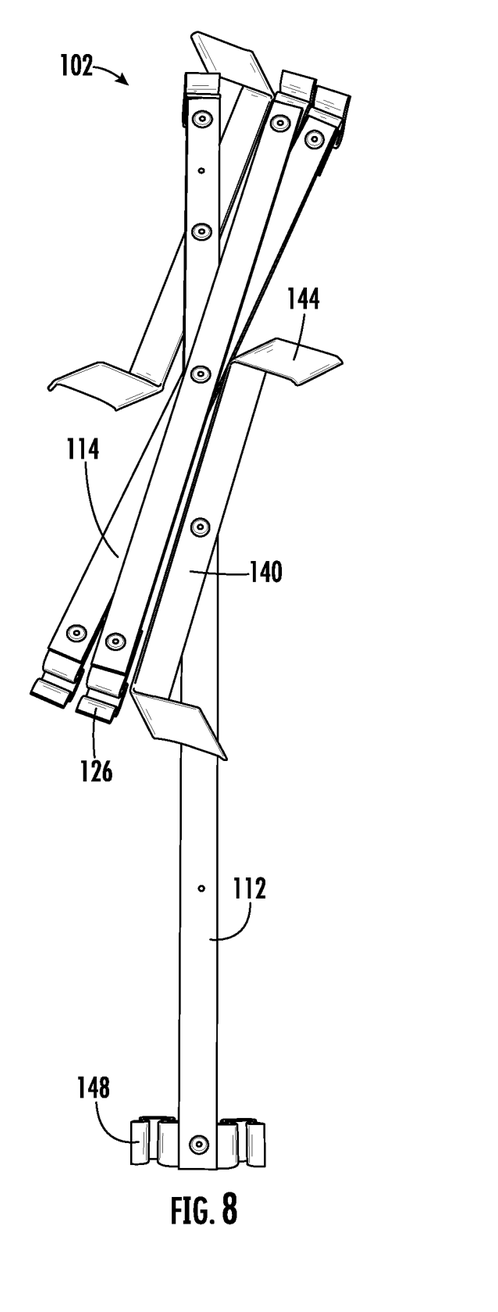
FIG. 8 is a perspective front view of the aerial cable management device as seen in FIG. 7 in the collapsed configuration in accordance with embodiments of the present disclosure.

FIGS. 7 and 8 illustrate another embodiment of the aerial cable management device 102 in accordance with another embodiment. FIG. 7 illustrates the aerial cable management device 102 in the in-use configuration with a cable 104 disposed within the receiving areas 126. FIG. 8 illustrates the aerial cable management device 102 in the collapsed configuration. As described above with respect to FIG. 6, the braces 140 can be coupled with the trunk 112 and the arms 114. The braces 140 can increase stability of the trunk 112 and arms 114 relative to one another to prevent the aerial cable management device 102 from collapsing undesirably when in use. Unlike the embodiment illustrated in FIG. 6 where the braces 140 are fastened to the trunk 112 and arms 114 using a fastener, the braces 140 depicted in FIGS. 7 and 8 utilize features 144 configured to be removably engaged with the arms 114 in the in-use configuration. In the illustrated embodiment, the features 144 include geometric shapes configured to snap on to the arms 114. More particularly, the geometric shapes can wrap around the arms 114 and prevent the arms from rotating undesirably. Use of a plurality of braces 140, as shown in FIGS. 7 and 8 and as described above can prevent relative rotation between the trunk 112 and arms 114 in both rotational directions while simultaneously providing a redundant bracing structure in the event of one brace 140 failing during use. In this regard, the aerial cable management device 102 can be locked in both a clockwise and counter-clockwise rotational direction. Each brace 140 can prevent rotation of each arm 114 in a particular direction. In certain instances, the use of counter-supporting braces 140 on opposite sides of the central pivot point 116 can prevent rotation in all directions. However, in other embodiments, a single brace 140 can be used to lock in place both arms 114 in both rotational directions.

To reconfigure the aerial cable management device 102 to the collapsed configuration, the braces 140 can be decoupled from the arms 114 and rotated about brace pivot points 146 to a collapsed orientation. Similarly, the arms 114 can be rotated about the central pivot point 116 to the collapsed orientation. In an embodiment, at least one of the brace pivot points 146 can have a rotational axis parallel with the rotational axis 120 of the central pivot point 116.

A cable guide 148 can be disposed along the trunk 112 or another part of the aerial cable management device 102 to secure the cable 104. In a particular embodiment, the cable guide 148 can be disposed at an end of the trunk 112, such as at the end where the cable 104 enters and exits the aerial cable management device 102.

Figure 9:
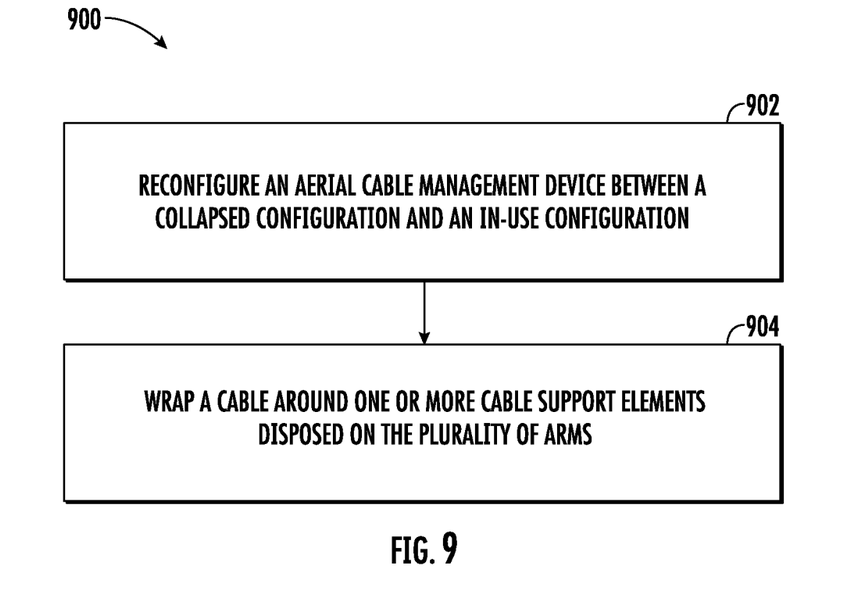
FIG. 9 is a flowchart of a method of using an aerial cable management device in accordance with embodiments of the present disclosure.

FIG. 9 depicts an exemplary flowchart of a method 900 of using an aerial cable management device in accordance with an embodiment. The method 900 can generally include a step 902 of reconfiguring the aerial cable management device between a collapsed configuration and an in-use configuration. The step 902 can be performed by rotating a plurality of arms of the aerial cable management device along a generally shared direction of rotation. That is, for example, the arms can rotate about a shared rotational axis. Alternatively, the arms can rotate about separate axis that are angularly offset by less than approximately 30°.

The method 900 can further include a step 904 of wrapping a cable around one or more cable support elements disposed on the plurality of arms. The cable can be wrapped around a cable pathway formed at least in part by the cable support elements. The cable may further be fixedly coupled to the aerial cable management device, for example, fastening the cable to a trunk portion of the aerial cable management device. This can be performed using, e.g., zip ties, snaps, clasps, or the like.

Aerial cable management devices 102 described herein are generally suitable for taking up cable slack while minimizing bulkiness in size and weight as compared to traditional designs. By reconfiguring the arms 114 in a generally shared direction of rotation corresponding generally to a best-fit plane formed by the loop of cable 104, strength of the aerial cable management device 102 may be increased relative to other collapsible designs. Moreover, receiving areas 126 define only a portion of the cable pathway 122. That is, the cable 104 is only in contact with the aerial cable management device 102 along a portion of the length of the cable pathway 122. By way of example, the portion of cable 104 disposed between the entrance and exit locations 128 and 130 of the aerial cable management device 102 does not continuously contact the receiving areas 126. By way of example, less than 90% of the cable 104 disposed in the aerial cable management device 102 can contact the receiving areas 126 (i.e., at least 10% of the cable 104 disposed between the entrance and exit locations 128 and 130 does not contact the aerial cable management device 102), such as less than 80% of the cable 104 disposed in the aerial cable management device 102 can contact the receiving areas 126, such as less than 70% of the cable 104 disposed in the aerial cable management device 102 can contact the receiving areas 126, such as less than 60% of the cable 104 disposed in the aerial cable management device 102 can contact the receiving areas 126, such as less than 50% of the cable 104 disposed in the aerial cable management device 102 can contact the receiving areas 126, such as less than 40% of the cable 104 disposed in the aerial cable management device 102 can contact the receiving areas 126, such as less than 30% of the cable 104 disposed in the aerial cable management device 102 can contact the receiving areas 126.

In an embodiment, the aerial cable management device 102 can be formed from one or more resilient materials. For instance, at least one of the arms 114 can be formed from a plastic, a metal, an alloy, a ceramic, a composite, or the like. Exemplary materials include, for instance, polyvinyl chloride (PVC), polyethylene terephthalate (PET), polypropylene (PP), polycarbonate (PC), acrylic, acrylonitrile butadiene (ABS), fiberglass, nylon, steel, aluminum, and the like. The material may be homogenous, layered, filled, or the like. Braces 140 can be formed from a same or different material as compared to the trunk 112 or arms 114. For instance, by way of example, the trunk 112 and arms 114 can include a first material (e.g., metal) and the braces 140 can include a second material (e.g., plastic). The aerial cable management device 102 may be subjected to extreme environmental conditions and may include any one or more fillings, coatings, reinforcement layers or structure, or the like to prevent undesirable damage or failure.

It should be noted that use of the term "aerial cable management device" is not intended to limit the device exclusively to application including aerial cables.

Further aspects of the invention are provided by the subject matter of the following clauses:

Embodiment 1. An aerial cable management device comprising: a trunk; and a plurality of arms, each arm including a body defining a central pivot point and having a cable support element disposed at both opposite ends of the body, wherein each of the plurality of arms is rotatably coupled with the trunk in a shared direction of rotation.

Embodiment 2. The aerial cable management device of any one or more of the embodiments, wherein the trunk is configured to be fixedly coupled to a cable, and wherein each of the plurality of arms is configured to retain the cable through cable tension.

Embodiment 3. The aerial cable management device of any one or more of the embodiments, wherein the aerial cable management device is configured to create a cable cross-over location where the cable intersects itself, as viewed along a rotational axis of the central pivot point, and wherein the cable cross-over location is disposed adjacent to a cable coupling location where the trunk is configured to be coupled to the cable.

Embodiment 4. The aerial cable management device of any one or more of the embodiments, wherein the trunk is further configured to retain the cable through cable tension at a location spaced apart from where the trunk is configured to fixedly couple to the cable.

Embodiment 5. The aerial cable management device of any one or more of the embodiments, wherein at least one of the cable support elements comprises a generally C-shaped receiving area for receiving a cable.

Embodiment 6. The aerial cable management device of any one or more of the embodiments, wherein the receiving areas are configured to support cable tension in a direction generally parallel with the shared direction of rotation.

Embodiment 7. The aerial cable management device of any one or more of the embodiments, wherein the aerial cable management device further comprises at least one brace configured to selectively maintain the aerial cable management device in the in-use configuration.

Embodiment 8. The aerial cable management device of any one or more of the embodiments, wherein the plurality of arms are rotatable between an in-use configuration and a collapsed configuration, and wherein at least one effective dimension of the aerial cable management device is at least 60% less in the collapsed configuration as compared to the in-use configuration.

Embodiment 9. The aerial cable management device of any one or more of the embodiments, wherein less than 90% of the cable disposed in the aerial cable management device is configured to contact the cable support elements.

Embodiment 10. An aerial cable management device comprising a body having an in-use configuration and a collapsed configuration, wherein at least one effective dimension of the aerial cable management device is at least 60% less in the collapsed configuration as compared to the in-use configuration.

Embodiment 11. The aerial cable management device of any one or more of the embodiments, wherein the body comprises a trunk and a plurality of arms, and wherein the trunk is configured to be fixedly coupled to a cable.

Embodiment 12. The aerial cable management device of any one or more of the embodiments, wherein the aerial cable management device is configured to retain the cable in a loop disposed in a generally vertical best-fit plane.

Embodiment 13. The aerial cable management device of any one or more of the embodiments, wherein the body is configured to move between the in-use and collapsed configurations by rotating the plurality of arms about a central pivot point in a shared direction of rotation.

Embodiment 14. The aerial cable management device of any one or more of the embodiments, wherein at least one of the plurality of arms comprises a cable support element comprising a generally C-shaped receiving area for receiving a cable.

Embodiment 15. The aerial cable management device of any one or more of the embodiments, wherein an angular offset between the in-use configuration and the collapsed configuration is at least 30 degrees.

Embodiment 16. A method of using an aerial cable management device, the method comprising: reconfiguring the aerial cable management device between a collapsed configuration and an in-use configuration by rotating a plurality of arms of the aerial cable management device along a generally shared direction of rotation; and wrapping a cable around one or more cable support elements disposed on the plurality of arms.

Embodiment 17. The method of any one or more of the embodiments, further comprising fixedly coupling the cable to the aerial cable management device at a cable coupling location.

Embodiment 18. The method of any one or more of the embodiments, wherein wrapping the cable around the cable support elements creates a cable cross-over location, and wherein the cable cross-over location is disposed adjacent to the cable coupling location.

Embodiment 19. The method of any one or more of the embodiments, wherein reconfiguring the aerial cable management device is performed such that at least one effective dimension of the aerial cable management device is at least 60% less in the collapsed configuration as compared to the in-use configuration.

Embodiment 20. The method of any one or more of the embodiments, wherein the cable support elements comprises a generally C-shaped receiving area for receiving the cable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aerial cable management device comprising:
a trunk; and
a plurality of arms, each arm including a body defining a central pivot point and having a cable support element disposed at both opposite ends of the body, wherein the cable support element comprises a generally C-shaped receiving area extending from a radial end of the plurality of arms, wherein each of the plurality of arms is rotatably coupled with the trunk in a shared direction of rotation, wherein the trunk extends greater than an extension of the plurality of arms along a radial direction from the central pivot point.

2. The aerial cable management device of claim 1, comprising:
a cable guide disposed along an end of the trunk where a cable enters and exits the aerial cable management device, wherein the trunk is configured to be fixedly coupled to the cable at the cable guide, and wherein each of the plurality of arms is configured to retain the cable through cable tension.

3. The aerial cable management device of claim 1, wherein the aerial cable management device comprises a fastener positioned at an end of the trunk where a cable enters and exits the aerial cable management device, wherein the fastener creates a cable cross-over location where the cable intersects itself, as viewed along a rotational axis of the central pivot point, and wherein the cable cross-over location is disposed adjacent to a cable coupling location where the trunk is configured to be coupled to the cable.

4. The aerial cable management device of claim 2, wherein the trunk is further configured to retain the cable through cable tension at a location spaced apart from where the trunk is configured to fixedly couple to the cable.

5. The aerial cable management device of claim 1, wherein the receiving areas are configured to receive a cable, and wherein the receiving areas are configured to support cable tension in a direction generally parallel with the shared direction of rotation.

6. The aerial cable management device of claim 1, wherein the aerial cable management device further comprises at least one brace configured to selectively maintain the aerial cable management device in the in-use configuration.

7. The aerial cable management device of claim 1, wherein the plurality of arms are rotatable between an in-use configuration and a collapsed configuration, and wherein at least one effective dimension of the aerial cable management device is at least 60% less in the collapsed configuration as compared to the in-use configuration.

8. The aerial cable management device of claim 1, wherein less than 90% of the cable disposed in the aerial cable management device is configured to contact the cable support elements.

9. An aerial cable management device comprising a body having an in-use configuration and a collapsed configuration, wherein at least one effective dimension of the aerial cable management device is at least 60% less in the collapsed configuration as compared to the in-use configuration, the body defining a central pivot point and having a cable support element disposed at both opposite ends of the body, wherein the cable support element comprises a generally C-shaped receiving area extending from a radial end of a plurality of arms of the body, and wherein the body comprises a trunk, and wherein the trunk is configured to be fixedly coupled to a cable, and wherein the trunk extends greater than an extension of the plurality of arms along a radial direction from the central pivot point.

10. The aerial cable management device of claim 9, wherein the aerial cable management device comprises a cable guide disposed or fastener disposed along an end of the trunk where a cable enters and exits the aerial cable management device and configured to retain the cable in a loop disposed in a generally vertical best-fit plane.

11. The aerial cable management device of claim 9, wherein the body is configured to move between the in-use and collapsed configurations by rotating the plurality of arms about a central pivot point in a shared direction of rotation.

12. The aerial cable management device of claim 9, wherein the cable support element is configured to support cable tension in a direction generally parallel with the shared direction of rotation.

13. The aerial cable management device of claim 9, wherein an angular offset between the in-use configuration and the collapsed configuration is at least 30 degrees.

14. A method of using an aerial cable management device, the method comprising:
reconfiguring the aerial cable management device between a collapsed configuration and an in-use configuration by rotating a plurality of arms of the aerial cable management device along a generally shared direction of rotation;
fixedly coupling the cable to the aerial cable management device at a coupling location; and
wrapping a cable around one or more cable support elements through a receiving area extending from radial ends of the plurality of arms, wherein wrapping the cable around the cable support elements creates a cable cross-over location, and wherein the cable cross-over location is disposed adjacent to the cable coupling location.

15. The method of claim 14, wherein reconfiguring the aerial cable management device is performed such that at least one effective dimension of the aerial cable management device is at least 60% less in the collapsed configuration as compared to the in-use configuration.

16. The method of claim 14, wherein the cable support elements comprises a generally C-shaped receiving area for receiving the cable.

* * * * *